Figure 1:
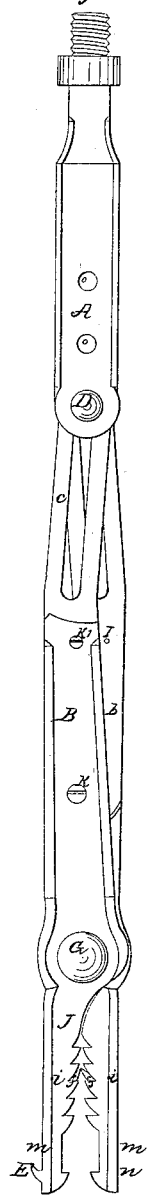

O. B. Latham,
Drill-Rod Grab.

N°51,325. Patented Dec. 5, 1865.

Witnesses.
J. W. Curry
Geo. W. Mead

Inventor.
O. B. Latham

UNITED STATES PATENT OFFICE.

OBADIAH B. LATHAM, OF SENECA FALLS, NEW YORK.

IMPROVED GRAPPLE-TONGS FOR OIL-WELLS.

Specification forming part of Letters Patent No. 51,325, dated December 5, 1865.

*To all whom it may concern:*

Be it known that I, OBADIAH B. LATHAM, of the village of Seneca Falls, in the county of Seneca, in the State of New York, have invented a new and useful Improvement in Grapple-Tongs, which improved grapple-tongs I call "Ready-Tongs;" and I do hereby declare that the following is a full and exact description thereof, reference being had to the accompanying drawings, and to the letters of reference marked thereon.

To enable others skilled in the art to make and use my invention, I will proceed to describe its construction and operation.

I construct my ready-tongs of steel, or steel and iron, according to the size, and as it is usual to use such material for like implements, having in view the offices of the different parts, they may be of various sizes and applied to various purposes. I commonly construct those intended for the removal of drills used for boring deep wells, which become fast, of the following proportions, from which the proper proportions of other sizes will be understood:

I make my ready-tongs about four feet in its entire length, measured when the shank is down. Its greater diameter is at the joint, which is about four and a half inches. The jaws are each about eleven inches long, and when closed the outer surfaces are in a straight line, having the outline of a portion of a cylinder on each outer surface, but cut away at the sides and between the jaws, as hereinafter described. The diameters of the jaws when closed, measured across from outside to outside of the curved surface, are about three and three-quarters inches. The handles are each about seventeen inches long, and of the same width of jaw near their junction at the pivot-bolt, which is about three and one-fourth inches, diminishing in width toward the top to two and a half inches, and one and a half inch thick, except at their junction with the levers. One-half of the thickness of each handle is removed to receive its respective lever. They extend in the direction of the length of the jaws. I make an extension of the handles in length by firmly securing to each handle, by two screw-bolts, an angular slotted lever. These levers are about twenty-two inches long, of which length about ten and a half inches thereof is let into its respective handle, the handle being formed into the proper shape to receive it. The portions of the levers which extend beyond the handles are made to diverge from the line of the handles outward in opposite directions at an angle of about eight degrees, and this part of each lever has a slot running through its middle in the direction of its length. This slot is about ten inches long and three-fourths of an inch wide, which extends to within one inch of the ends of the levers, which are solid. These levers and the slots therein are rounded at their ends, and have flat sides. The jaws are hinged upon a bolt, which passes through corresponding holes in each jaw, secured by a head and nut or other known means. This bolt is about one inch in diameter. A shank to operate the handles is connected with the levers by a bolt which passes through the slot in each handle, the ends of the handles playing in a slot formed in the shank. The shank is about twenty-one inches long, and is about three inches square, and the slot in the shank is about twelve inches long and one and a half inch in breadth. The sides of the slot and of the portion of the shank which extends along the slot are flat. The stem of the shank is formed with a male-screw coupling at its upper end.

The further description of the construction of my ready-tongs will be found in the explanation and description of the accompanying drawings, in which—

Figure 3:
Figure 2:
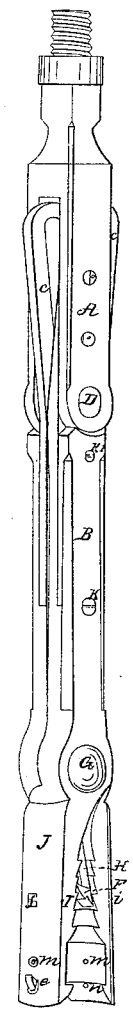
Figure 4:
Figure 5:
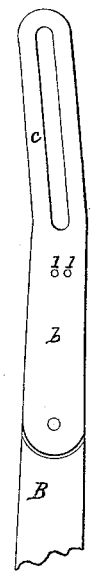

Figure 1 represents a side view of my ready-tongs, showing the jaws closed. Fig. 2 is a perspective view of the same, showing the jaws open. Fig. 3 is a longitudinal section through the center of the several parts, and nearly in the plane of the face of the jaws. Fig. 4 is a longitudinal section of one of the jaws (both being of like form) transverse to the plane of the jaw. Fig. 5 is a longitudinal section of one of the angular slotted levers *c c*.

A is the shank, made solid for one-third of its length from the upper end, with a male screw-coupling at the top, and divided at the bottom of the solid part into two bars, $a'$ $a'$, parallel to each other, with flat sides and with an open slot between them sufficient to permit the two levers *c c* to move freely therein through the bars $a'$ $a'$ opposite. Across the slot between them are three pairs of holes, *o o o o o o*, corresponding to each other, and at equal distances apart—that is, about three inches. These holes are to receive the pin or bolt D, which may be fixed in either pair by a nut in the usual manner. By shifting the bolt D from one pair of holes to another, the movement of the jaws are made more or less.

B B are the handles, which are made in one piece with the jaws. J J are the jaws, hinged on the pivot-bolt G, which secures them together and is their center of action. This bolt passes through the center of each, where the jaws and handles join. The handles lie in contact with and slide upon each other. The jaws overlap the center of each on the opposite side, so as to be nearly in line with the handles and make the jaws equal in width on each side.

c c are two angular slotted levers, each of which is secured to the respective handles B B by the screw-bolt K and K'. The levers are adjustable and may be adjusted to give a greater or less opening to the jaws by screwing the bolt K' into either of the holes I I in the slotted levers c c which may be desired.

The jaws J J have their interior surfaces formed upon the segment of a circle in their transverse direction, being somewhat conical in shape, the opening becoming less in diameter as it approaches the joint. They are sharpened inward at their ends. The lower portion of the jaws is formed on the inside to fit the male and female couplings of tools (used in boring wells and for like purposes) and rods. The upper portion, above the recess, has ratchet-shaped teeth projecting inward on each jaw.

f f are two fangs, set in a mortise near the middle of each jaw opposite to each other. They are kept in position by the pin i and the springs h h and fall back into the recess P when they meet resistance from below; but being pressed out by the springs h h they take hold when the tongs are drawn upward, the heels of the fangs find a bearing against the upper end of the mortise, and the lower sides of the fangs bear against the lower ends of the recess, giving them a firm bearing independent of the pins by which they are kept in position.

n n are two sets of holes, on the outward sides and near the lower ends of each jaw, with a screw-thread therein, into which the spur E may be screwed when it is required to remove a hollow body like a cylinder under circumstances where it cannot be grasped by the tongs on the outside. This is done by screwing the spur E into the jaw in the holes n n, taking off the levers c c and reversing each in its position upon the respective handles, so as to turn the angles of the levers outward from each other, in which position they are made fast by their respective bolts. So arranged, the upward motion of the shank A opens the jaws and the spur E takes hold of the cylinder on its inner surface.

Fittings are sometimes applied to the lower interior surfaces of the jaws to make the openings less. They are held by screws passing through the countersunk holes m m.

In operating my ready-tongs, when they are forced or dropped down upon the tool to be removed, the jaws are forced open and seize upon it and hold by their teeth or fangs, and as the shank A is drawn upward, it firmly closes the jaws upon the tool or substance to be removed by drawing the bolt D through the slots in the levers c c; or the action of the jaws may be reversed, as above stated and described.

I do not claim all the parts of the tongs described as my invention; but I am aware that various kinds of grapple-tongs, having some of the parts described, have been before known and used.

What I claim as my invention, and desire to secure by Letters Patent, is—

1. The application of the levers c c to the handles B B and in combination therewith, in the manner and for the purposes described.

2. Making the levers c c adjustable upon the handles B B, in the manner and for the purposes described.

3. The combination of the shank A, with the levers c c and the bolt D, passing through either of the pairs of holes o o o, for regulating the movement of the jaws, in the manner described.

4. The fangs f f, constructed and applied as described, in combination with the jaws.

5. The spur E, in combination with the jaws, for the purposes and operating as described.

O. B. LATHAM.

In presence of—
F. W. HENRY,
GEO. W. MEAD.